United States Patent [19]

Fay et al.

[11] B  3,989,936

[45] Nov. 2, 1976

[54] METHOD AND APPARATUS FOR THE FEED FORWARD CONTROL OF A MATERIAL TREATER

[75] Inventors: Charles Robert Fay, Cincinnati, Ohio; Alfred Thomas Guertin, Somerville; John William Stinson, Wayne, both of N.J.

[73] Assignee: Formica Corporation, Cincinnati, Ohio

[22] Filed: Nov. 1, 1974

[21] Appl. No.: 520,076

[44] Published under the second Trial Voluntary Protest Program on March 2, 1976 as document No. B 520,076.

[52] U.S. Cl. .......................... 235/151.1; 235/151.3; 118/8; 118/9
[51] Int. Cl.² ................................................ G06G 7/58
[58] Field of Search ................. 235/151.13, 151.12, 235/151.1, 151.11, 151.3, 151.33, 151.35; 73/23, 150; 118/8, 9; 117/66

[56] References Cited

UNITED STATES PATENTS

| | | | |
|---|---|---|---|
| 3,073,153 | 1/1963 | Petitjean | 73/73 |
| 3,260,642 | 7/1966 | Canter, Jr. | 162/252 |
| 3,378,676 | 4/1968 | Clement | 235/151.3 |
| 3,596,071 | 7/1971 | Doering | 235/151.35 X |

Primary Examiner—Edward J. Wise
Attorney, Agent, or Firm—Frank M. Van Riet

[57] ABSTRACT

An improved process and apparatus are disclosed wherein the resin treatment of a web on a material treater is conducted utilizing only one gauge to effect precise feed forward control.

10 Claims, 7 Drawing Figures

METHOD AND APPARATUS FOR THE FEED FORWARD CONTROL OF A MATERIAL TREATER

BACKGROUND OF THE INVENTION

The use of beta gauge systems to control material treaters is disclosed and claimed in U.S. Pat. No. 3,596,071, hereby incorporated herein by reference. The procedure disclosed therein employs three beta gauges which continuously scan across the material web being treated. The patentee uses conventional feedback control techniques which with the advent of high speed treaters is an inadequate method of control because of the large volume of product lost between the time the apparatus is discovered to be producing an inferior product and the time when adjustments can be made in order to correct the error and put the product back within specification limits.

With the increasing use of digital computers for process control purposes, the analog system of the above patent is outmoded. High speed, flexible usage digital computers now permit rapid action control schemes to be employed. With the older computer systems, control actions are possible only about every 60 seconds and since many of these treaters run at 500–1,000 feet per minute, it can be readily appreciated that considerable amounts of out of limits material can be produced before corrective action can be taken.

SUMMARY

Our novel control method and apparatus utilizes models for reference to control, by feed forward methods, the resin application and drying operations of a material treater to maintain optimum quality of the product at lowest possible cost.

Our invention has the additional advantage of requiring only one scanning gauge in place of the three required by the above patented process. Thus, the control system hardware etc. is much less costly to purchase and maintain.

Basically, we have discovered that feedback control is inadequate for controlling the resin application and drying operations of a material treater wherein wide variations in the web undergoing treatment are prevalent. Any variation in the basis weight of the web, for example, of more than 2–3 pounds per 3,000 square feet causes considerable variation in resin application and drying control. More particularly, if the basis weight of the web continues to change consistently in one direction, conventional feedback control is not adequate because the resin application and drying variables are never at their desired values. Our invention circumvents this problem by adjusting the applicator and dryer before the disturbance has time to effect them, thus the variables of resin applying and drying are always maintained at their specified values. The result is a reduced resin usage, constant resin and drying levels and improved product quality and uniformity.

BRIEF DESCRIPTION OF THE DRAWINGS

FIG. 6 (6A and 6B) is a dryer model analog diagram.

DESCRIPTION OF THE INVENTION INCLUDING PREFERRED EMBODIMENTS

The instant invention is directed to a feed forward control of the resin applicating and drying operations of a material treater utilizing only one gauge to measure the raw material variations before the coating and drying operations are performed. An applicator model and a dryer model are employed for the control of the resin applicating and drying operations, respectively. These control models determine the precise value required of a given manipulated parameter such as the speed of the applicator roll, the gap settings of the applicator and the line speed of the material being treated to accurately control resin application and drying.

Figure 1:
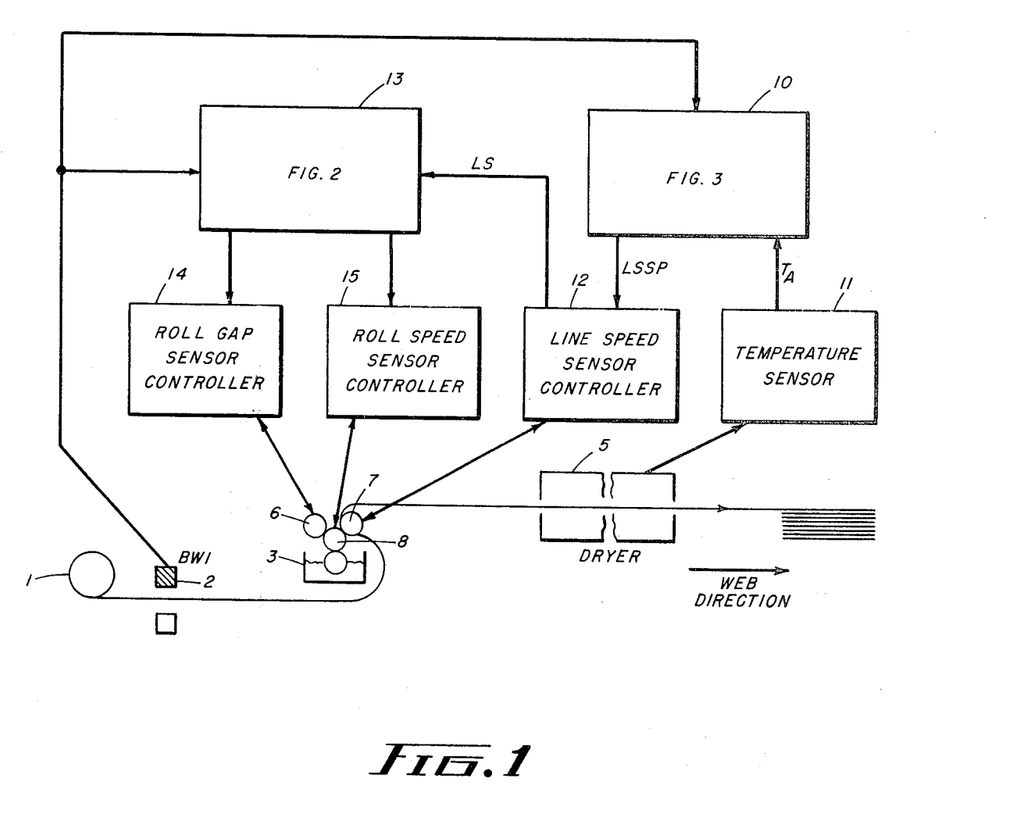
FIG. 1 is a diagrammatic view of a resin applicating and drying system showing schematically a gauge and its connection to the process variables of the remaining system.

Referring now to FIG. 1, the raw web material (glass, paper, fabric, etc.) unwinds from a roll 1 and passes through a scanning beta gauge 2, where the untreated, raw basis weight, $BW_1$, (in pounds/3,000 sq. ft. or other suitable units) is measured. These values are generally averaged over 1 second to remove most of the measuring "noise" of the beta gauge system. Using a digital computer, analog computer, or a hybrid computer system for calculations and storage of values, each individual one second $BW_1$ value can be stored for future use in the control equations, in the applicator model 13 FIG. 2 and the oven model 10 FIG. 3.

Figure 2:
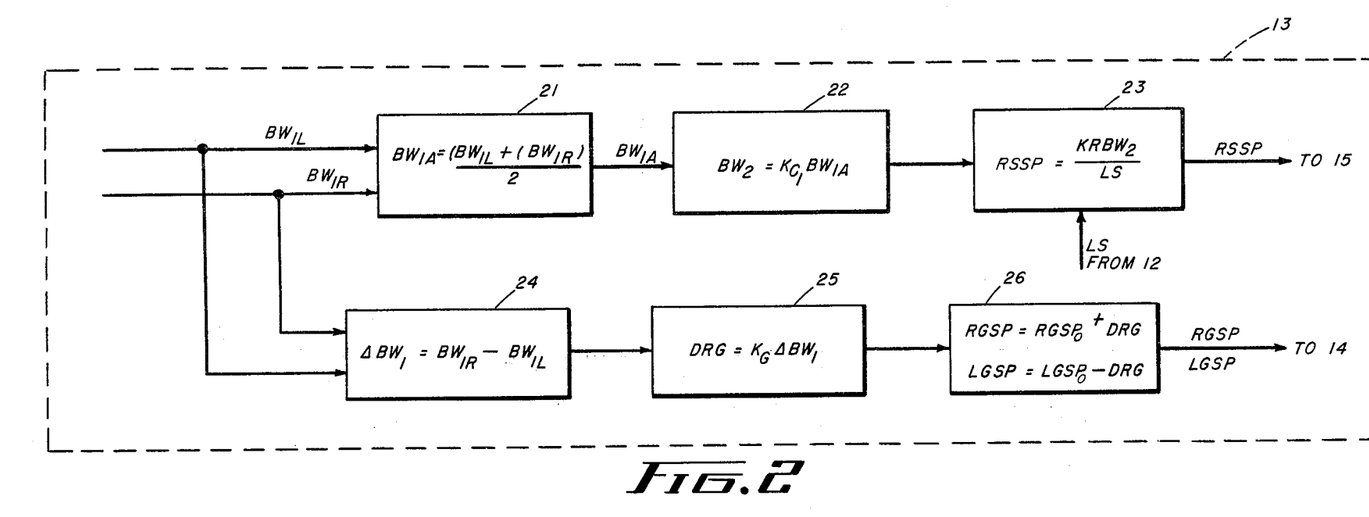
FIG. 2 is an applicator model diagram showing the calculations conducted in zone 13 of FIG. 1.

From the scanning beta gauge 2, the raw web passes through applicator 3. This applicator can be any type, such as reverse roll coater (shown in FIG. 1), dip and scrape coater, dip and squeeze coater, etc. Using the example of a reverse roll coater, control of the coater is effected by changes in the applicator roll speed (middle roll 8, FIG. 1) to control average resin content, and in the various gaps between the rolls 6 and 8 to control side-to-side resin variations. Thus, the applicator model 13 is used to calculate the gap set points which are sent to the roll gap sensor-controller 14 and the applicator roll speed set point which is sent to the roll speed sensor-controller 15.

The treated web leaving the applicator 3 passes through the dryer 5 and is ready for further processing (such as, for example, cooling, cutting and stacking or rolling, etc.). The oven model 10 calculates the line speed set point for input to the line speed sensor-controller 12, in order to maintain constant drying of the treated material web. To maximize throughput our invention can be used in conjunction with copending application, Ser. No. 446,076, filed Feb. 26, 1974 now U.S. Pat. No. 3,845,287.

The only true short term upset to the material treating process is the variation in raw web basis weight, $BW_1$. Our invention comprises a method and apparatus of controlling the applicating and drying operations of a material treater, using feed forward control concepts based on the variations of $BW_1$, as mentioned above.

The following is the manner in which the feed forward control functions to control the resin application and drying. The application operation involves the definition of % resin as %Ra (U.S. Pat. No. 3,596,071):

$$\%Ra = \frac{(BW_2 - BW_1)F}{BW_1\left(1 - \frac{\%M}{100}\right)} \times 100$$

where
BW$_1$ has been previously defined and
F = Resin solids fraction
%M = % by weight of moisture in the raw web and
BW$_2$ = Wet treated weight, i.e. total weight between the applicator and the dryer.

Suppose it is desirable to control %Ra to 34%, with %M = 2, (amounts previously found to give acceptable results) and F = 0.68, a known variable. Solving for BW$_2$ gives:

$$BW_2 = BW_1 + \frac{.34 \, (BW_1) \, .98}{.68}$$

or BW$_2$ = 1.49 BW$_1$.

Hence, it is necessary, in this instance, to control the applicator to obtain BW$_2$ = 1.49 BW$_1$, knowing the BW$_1$ values from scanning across the web. For example, a value for BW$_1$ is measured and recorded every 1 second. If the web width is 60 inches, and the scan speed is 1 inch/second, 60 BW$_1$ values are collected and stored every scan. Thus, the digital computer contains an array of BW$_1$ numbers to be used for control. The first 30 values are averaged and the last 30 values are averaged thus giving left (BW$_{1L}$) and right (BW$_{1R}$) zone averages respectively for the raw web basis weight. These averages are then used by the applicator model to control the roll speed and roll gaps between rolls 6 and 8 of the applicator according to a model such as that shown in FIG. 2. The reverse roll speed is set by averaging the left and right zone basis weights (box 21), calculating the treated weight required (box 22) (where Kc$_1$ is 1.49 if the preceding example applies, but this constant depends on the particular case involved and is determined experimentally), and then calculating the reverse roll speed set point needed to attain this basis weight (box 23). All the calculations shown may be replaced by a much more complex system such as equations fit to experimental data and/or a non-linear model. K$_R$, shown in box 23, is a tuning constant which is determined experimentally and/or is periodically revised and corrected, as needed, to maintain good control. This is done at irregular intervals as desired or as often as required using standard on-line adaptive control techniques.

Also shown in FIG. 2 is an exemplary method for controlling of the roll gap according to the instant invention. The left and right zone averages are subtracted (box 24) and the change in roll gap needed (DRG) is calculated (box 25) using a tuning constant K$_G$ which is determined similarly to K$_R$ above. This needed change is then added to one original side gap set point RGSP$_O$ and subtracted from the other original side gap set point LGSP$_O$ in box 26 in order to maintain the average resin application constant. Thus this method controls the side-to-side variations and allows the average resin variations to be controlled by the reverse roll speed.

In a similar manner as described above for applicator control, %Va is used as a control equation for the ovens (see Doering, U.S. Pat. No. 3,596,071) where $$\%Va = 100 \times \frac{BW_3 - \left[(BW_2 - BW_1)F + BW_1\left(1 - \frac{\%M}{100}\right)\right]}{BW_1\left(1 - \frac{\%M}{100}\right)}$$

where BW$_3$ = the dried treated weight, i.e. the applied weight after the dryer.

Using the numbers previously used, plus using %Va = 5.0, a known, determined variable, BW$_3$ = 1.362 BW$_1$ (2).

Figure 3:
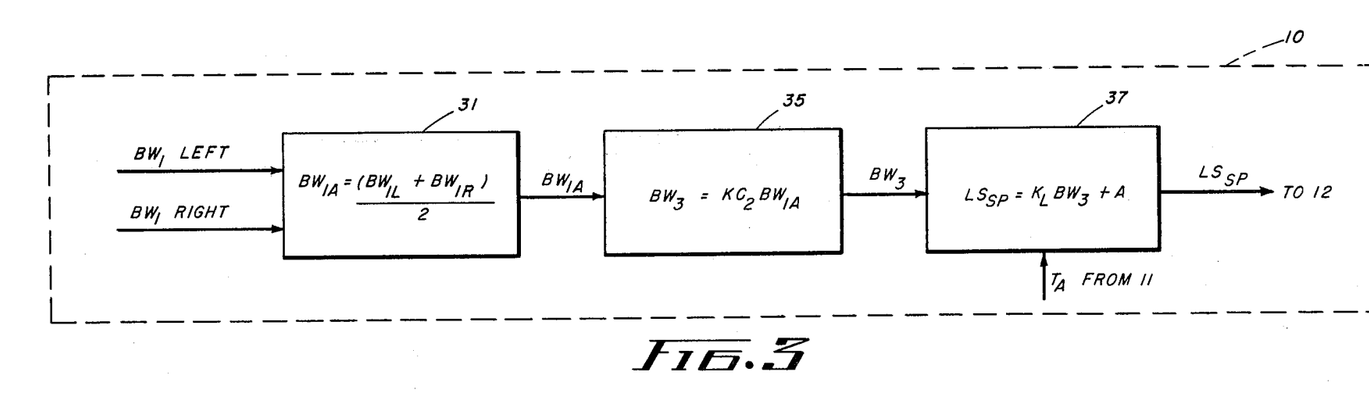
FIG. 3 is a dryer model diagram showing the calculations conducted in zone 10 of FIG. 1.

Hence, the dryer is controlled so as to maintain the final weight emerging from the resin application and drying process at 1.362 BW$_1$. Note that the applied weight (BW$_2$) does not appear as a factor in the dryer control. This is because it is being controlled to a *constant* desired value by the model (FIG. 2). An example of the dryer model is shown in FIG. 3. The two zone averages for the raw paper basis weight (BW$_{1L}$ and BW$_{1R}$), as previously defined, are averaged (box 31) and the desired final weight (BW$_3$) is calculated (box 35) using a constant Kc$_2$ which is the 1.362, as previously determined for this example, but again depends on the particular treatment under consideration and is determined experimentally.

The line speed necessary to attain this final weight is then calculated in box 37 and is outputted as the line speed set point (LSSP) for the line speed sensor-controller box 12 of FIG. 1 and finally to roll 7 of applicator 3 to control the speed of the passage of the web through the dryer. The two tuning constants K$_L$ and A used in box 37 are experimentally determined so as to give good control and are revised and corrected as described above for K$_R$. The dryer temperature T$_A$, from 11, FIG. 1, is an input to block 37 since the tuning parameters K$_L$ and A are generally temperature dependent. For example, in this instance, an array is stored in the computer so that for T$_A$, A would be used in the control equation of box 37 to determine LSSP, the line speed set point.

Figure 4:
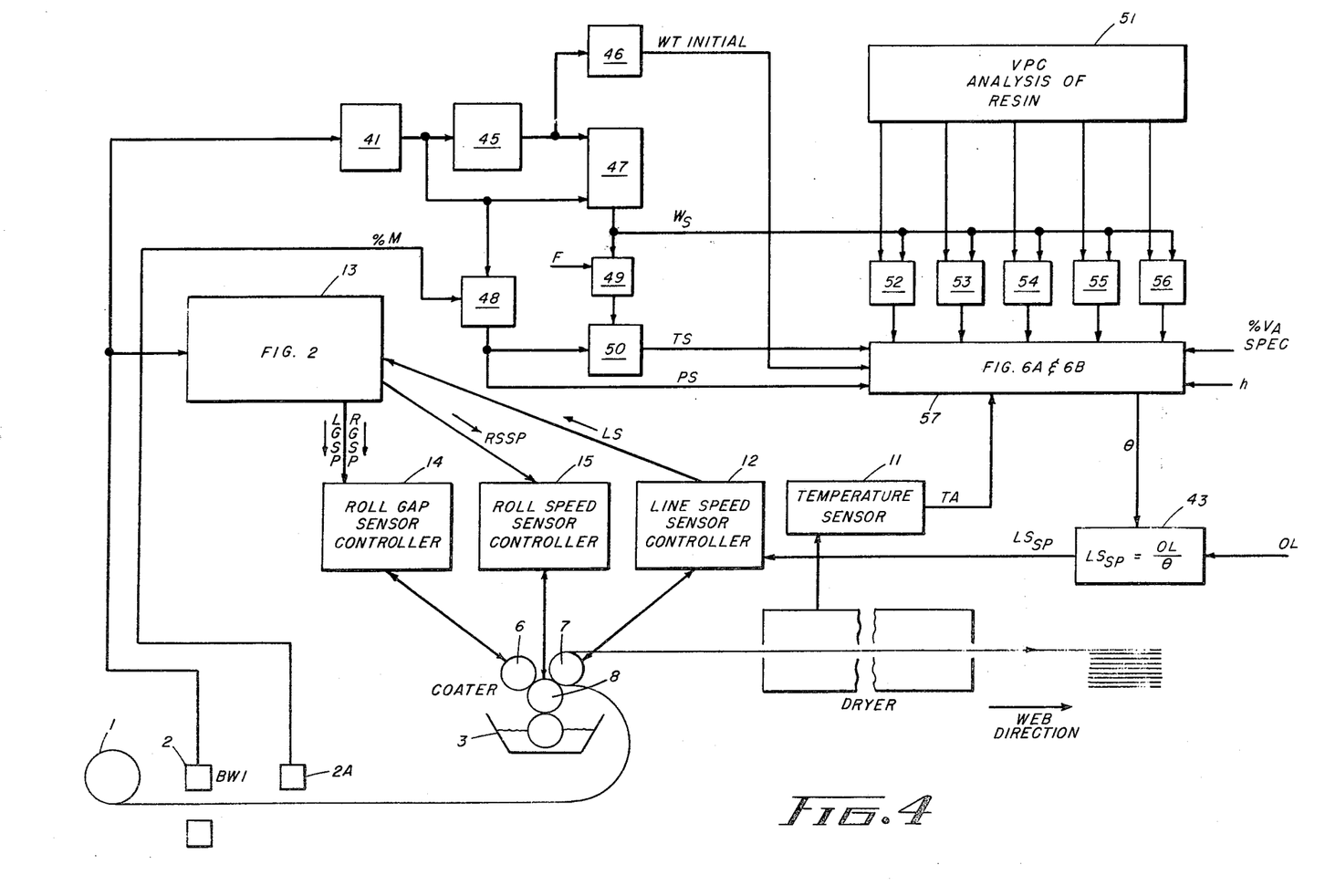
FIG. 4 is a second diagrammatic view of a control system according to the present invention whereby the percent moisture of the web and a resin solution analysis is employed.

Another example of an oven model which may be used as a control in the instant invention is set forth in FIG. 4. Again, the fibrous web 1 passes by beta gauge 2, wherein BW$_1$ is measured, and the web moisture is measured by moisture gauge 2A. The web then passes through applicator 3, again shown as a four roll reverse roll coater, and then through dryer 5 to stacking.

Figure 5:
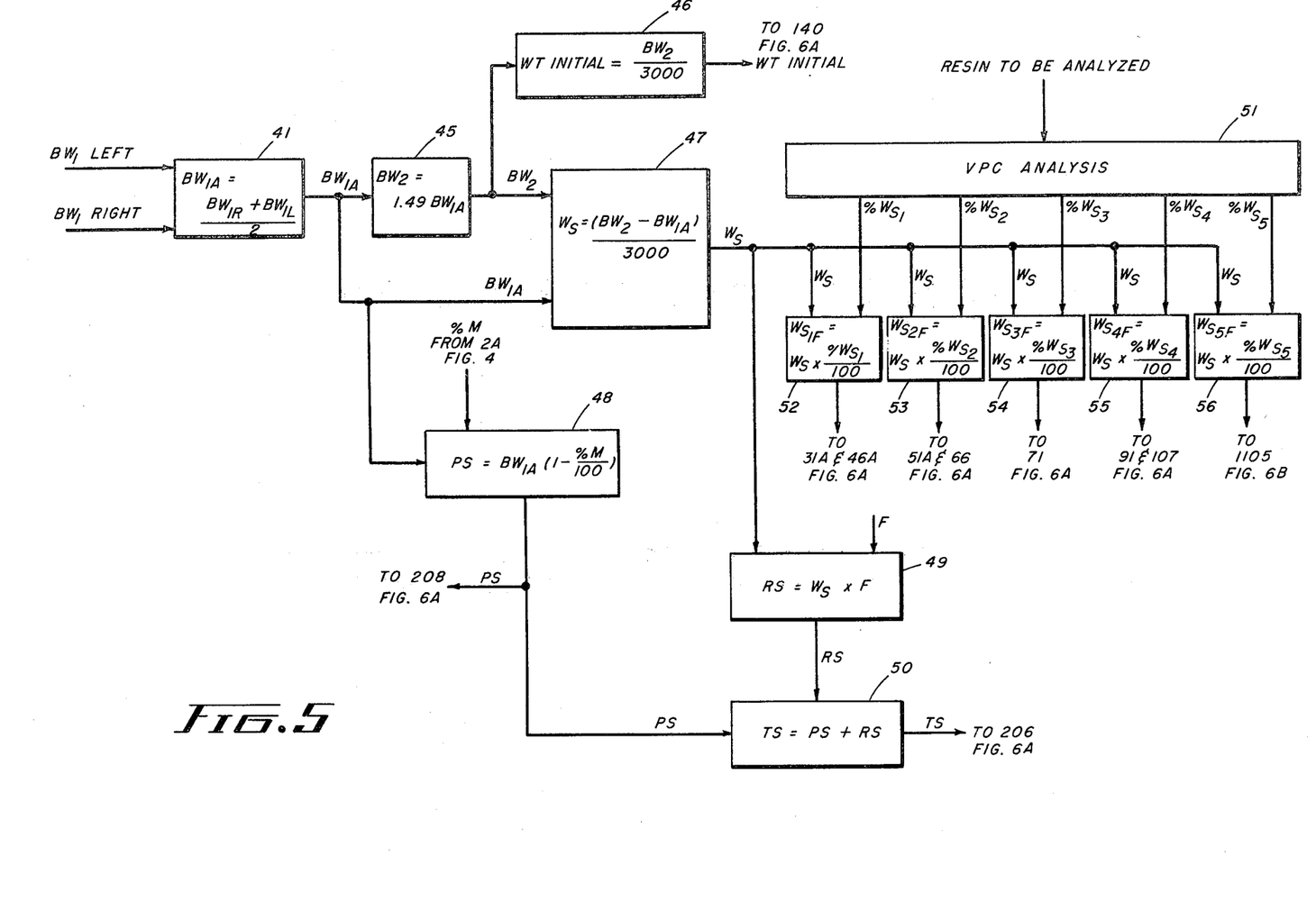
FIG. 5 is a diagram showing the calculations involved in determining the inputs to FIGS. 6A and 6B.
Figure 6A:
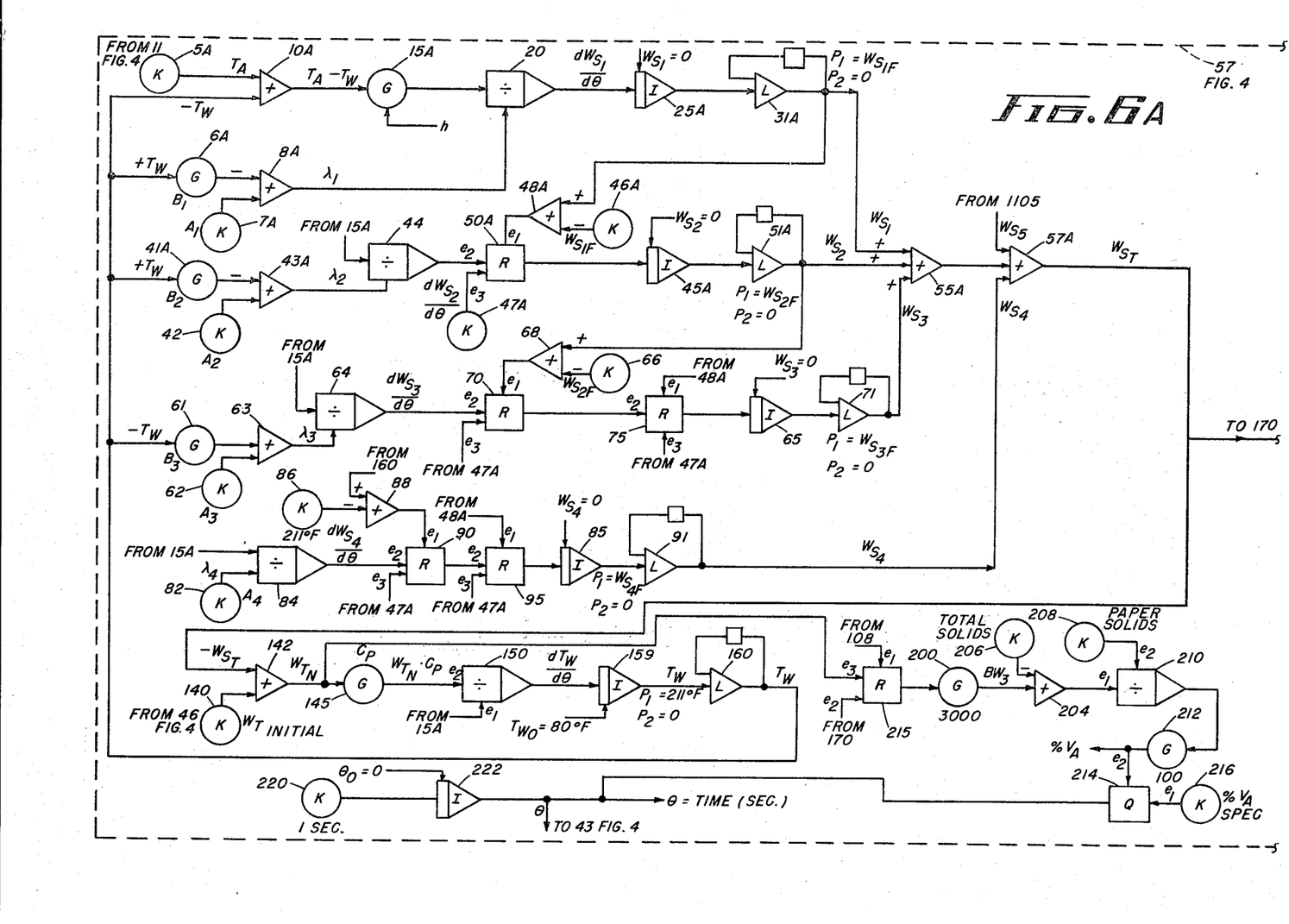
Figure 6B:
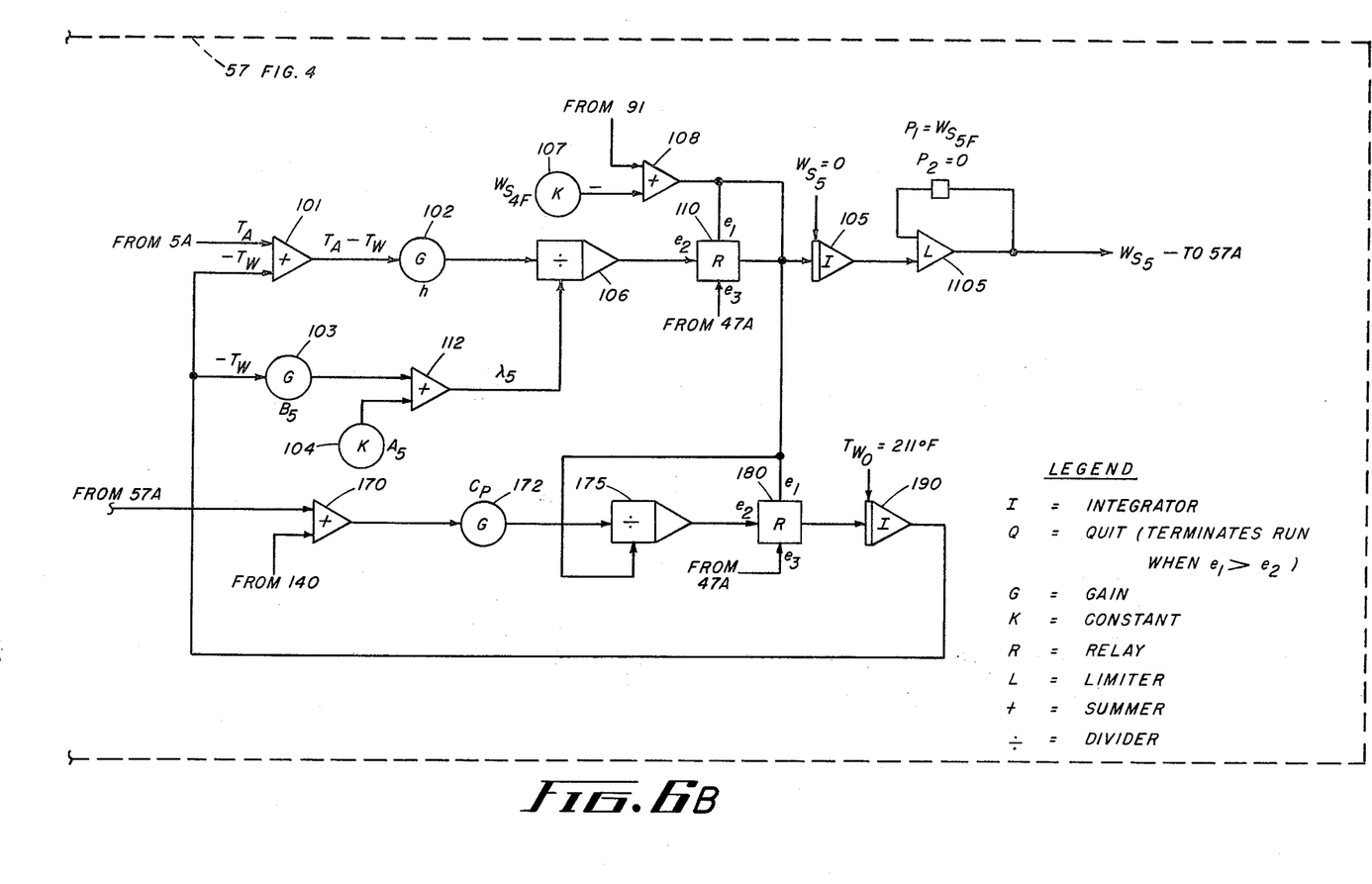

FIG. 5 is a block diagram and, taken in conjunction with FIG. 4, shows the calculations of the inputs to the dryer model of FIGS. 6A and 6B. Referring to FIGS. 4 and 5, the BW$_1$ value from 2 is sent to zone 13 wherein it is utilized to calculate and control the roll gap set points between rolls 6 and 8, as described above. The BW$_1$ value also passes from 2 to block 41 wherein the right and left zone basis weights are averaged as in zone 21. The averaged zone basis weight is then used as an input to block 45 to calculate BW$_2$, to block 47 in conjunction with BW$_2$, from block 45, to calculate WS, the total solution of resin added to the web, and to block 48 to calculate PS, the paper solids (a paper web being used as exemplary). PS is calculated by also utilizing %M, transmitted to block 48 from gauge 2A. BW$_2$ from block 45 is also used to calculate WT initial, block 46, the initial web wet weight (weight of web after resin application, BW$_2$ divided by 3,000).

WS, from zone 47 is used in block 49 with constant F, the resin solids fraction, as determined by ASTM solids testings or by instrumentation, to determine RS, the resin solids, which is then transmitted to block 50 with PS from 48 to calculate TS, the total solids of the system. The RS value should be multiplied by 3000 in order to equate the bases of the inputs RS and PS for the TS calculation.

Block 51 provides the Vapor Phase Chromatograph (VPC) analysis of the resin with which the given web is treated. This device can be replaced by any off-line analysis or any on-line continuous measuring device which can be used to determine the percentage composition of the solvents in the resin system. For the example being shown, five solvent components are involved and are analyzed, with resulting percents by weight being given as $\%W_{S_1}$, $\%W_{S_2}$, $\%W_{S_3}$, $\%W_{S_4}$, and $\%W_{S_5}$. WS and $\%W_{S_1}$ are the inputs to block 52, which calculates $W_{S_{1F}}$ (the final weight of the first solvent component in lbs. per sq. ft.), inputs to block 31A and 46A, respectively of FIG. 6A. In the same manner, $W_{S_{2F}}$ is calculated in block 53 and is used as inputs to blocks 51A and 66, respectively, of FIG. 6A, $W_{S_{3F}}$ is calculated in block 54, and is used as an input to block 71 of FIG. 6A, $W_{S_{4F}}$ is calculated in block 55 and is used as inputs to blocks 91 (FIG. 6A) and 107 (FIG. 6B), respectively, and $W_{S_{5F}}$ is calculated in block 56 and is used as an input to block 1105 of FIG. 6B. The initial web wet weight, $W_T$ initial, in lbs. per sq. ft., is calculated in block 46, is the input to block 140, FIG. 6A. PS is an input from 48 to block 208, FIG. 6A and also to block 50. Note that if the %M were a constant manual entry of zero, the method would be identical to no input of moisture. Hence, the previous equations for %Ra and %Va would merely be modified accordingly by replacing all $$BW_1 \left(1 - \frac{\%M}{100}\right)$$

with $BW_1$. TS is the input to block 206, FIG. 6A while the dryer air temperature, $T_A$, from sensor 11 is the input to block 5A of FIG. 6A. %Va spec., previously determined, is the input to block 216 of FIG. 6A while h, the film coefficient of the ultimate product, also predetermined, inputs at blocks 15A of FIG. 6A and 102 of FIG. 6B.

FIG. 6 6A and 6B is a Treater Model Analog Diagram, that is solved either on an analog computer, or by using a digital computer to solve an equivalent digital program.

The following assumptions are made in developing the treater model, the distributed parameter mathematical model of the dryer (modelling the drying of 1 sq. ft. of web as it passes through the dryer):

1. Specific heat of the wet web (Cp) can be considered a constant.
2. The changes in humidity of the air in the dryer can be neglected due to the large air volumes.
3. The heat is transferred to the treated web entirely by convection from the heated air.
4. The constant rate of drying equation well represents the total drying in the oven of the treater.
5. The solvents are removed in the order of increasing boiling points and increasing vapor pressures, with the exceptions of phenol and water.
6. Phenol and water are removed as an azeotrope at 211°F., the composition of the azeotrope being 90.8% by weight water, 9.2% by weight phenol.
7. Additional phenol, due to its high boiling point and low vapor pressures at lower temperatures, and due to the presence of the azeotrope with water at 211°F., will not be removed by itself until after the water present has been used up by the azeotrope.
8. No chemical reaction occurs during the treating operation.

Considering the constant rate of drying, at steady state the heat that flows into the web must be equal to that removed by the evaporated solvents. When air is the only heat source (convective heat transfer only), the balances are as follows:

$$\frac{dQ}{d\theta} = hA(T_A - T_w) \qquad (1)$$

$$\frac{dW_{si}}{d\theta} = \frac{dQ}{d\theta} / \lambda i \qquad (2)$$

thus:

$$\frac{dW_{si}}{d\theta} = \frac{hA(T_A - T_w)}{\lambda i} \qquad (3)$$

For the heating of any material:

$$\frac{dQ}{d\theta} = W_{T_n} Cp \frac{dT_w}{d\theta} \qquad (4)$$

thus:

$$\frac{dT_w}{d\theta} = \frac{hA}{W_{T_n} Cp}(T_A - T_w) \qquad (5)$$

where:

$\frac{dQ}{d\theta}$ = Rate of heat absorption, Btu/sec.

$h$ = Film coefficient or convective heat transfer coefficient, $\frac{Btu}{sec. \; ft.^2 \; °F.}$ $A$ = Area of heat transfer surface, sq. ft.; = 1 sq. ft. (basis of calculations)

$T_A$ = Air temperature, °F.

$T_w$ = Web temperature, °F.

$\frac{dW_{si}}{d\theta}$ = Rate of removal of solvent $i$, lbs./sec.

$Cp$ = Heat capacity, Btu/lb.

$W_{T_n}$ = Weight of 1 sq. ft. of web in dryer, at time $\theta$, pounds.

$\lambda i$ = Latent heat of vaporization of component $i$, Btu.lb.

Equation 3 is used to solve for $W_{si}$ and equation 5 is used to solve for $T_w$. These two differential equations are solved simultaneously using an analog computer, programmed as shown in FIG. 6 6A and 6B. Referring to FIG. 6, the dryer model diagram will be described as it relates to phenolic treated paper. Starting at pot 5A, $T_A$, the average air temperature of the oven, and $-T_W$, the web temperature are summed by amplifier 10A. The resulting $T_A-T_W$ signal is passed through a potentiometer 15A with h to give a gain, to obtain $h\, T_A-T_W$. The latent heat of vaporization for component 1 (methanol in this case) is calculated for the web temperature $T_W$, by pots 6A and 7A ($B_1$ and $A_1$ are constants) being summed by amplifier 8A. The division circuit 20 then calculates $$\frac{dW_{s1}}{d\theta} = \frac{h(T_A - T_w)}{\lambda 1}$$

(A=1 sq. ft.),
equation 3.

Integrator 25A solves $dW_{s1}/d\theta$ for $W_{s1}$. Limiter 31A limits the integrator 25A output to the total weight ($W_S$) of methanol present in the resin used for impregnating the raw paper web. In the same manner, the other alcohols, ethanol 51A and isopropanol 71, are removed during the drying operation. The water:phenol azeotrope 91 is removed at the azeotrope temperature of 211°F., by holding the web temperature during azeotrope removal at 211°F.

Once the water:phenol azeotrope is removed, the web temperature again increases as phenol block 1105 is removed, until the final %Va is obtained. The %Va is continuously calculated as described below.

Amplifiers 55A and 57A are used to sum the weight of the components removed by drying at a given time. The total weight removed $W_{S_T}$ from Amplifier 57A is inputted to Amplifier 142, along with $W_T$ initial, pot 140, the initial weight of the raw paper and wet resin, ($BW_2/3,000$) in lbs./sq. ft., from block 46, FIG. 4. The resultant $W_T$, the weight remaining after drying, is then multiplied by Cp 145 to form $W_{T_n}$ Cp. Divide circuit 150 gives (see equation 5)

$$\frac{dT_w}{d\theta} = \frac{h(T_A - T_w)}{W_{T_n} C p}$$

(since A=1 sq. ft.) and integrator 159 solves for $T_w$ as a function of time. Limiter 160 limits the output of integrator 159 to 211°F., the water:phenol azeotrope temperature. Once the azeotrope is removed, the analog circuit of Amplifier 101 through Integrator 190 calculates the weight 1105 of phenol removed and the web temperature during the phenol removal 190. Relay 215 selects the desired $W_{T_n}$ which is multiplied by 3,000 200 to obtain $BW_3$, in lbs./3,000 sq. ft. %Va is then calculated by Amplifier 204, pots 206 and 212 and divide circuit 210.

The %Va spec. is the input to block 216. Block 214 compares $e_2$ (%Va) to $e_1$ (%Va spec.). If $e_1$ is greater than $e_2$, the computer run is terminated. Block 220 inputs a time base (for example, 1 second) to block 222, which is an integrator with an initial value of 0. The output from integrator block 222 is the time ($\theta$) in seconds required for the model to obtain the %Va calc.=%Va spec. i.e. the drying time. It should be noted that $e_1$ is the first input to a given block, $e_2$ the second and $e_3$ the third, in all instances.

The dryer model, block 57, FIG. 4, calculates the drying time $\theta$ seconds, as detailed in FIG. 6. Block 43, FIG. 4, calculates the treater model line speed set point, LSSP, from the dryer oven length, OL, and $\theta$. The line speed set point on 12 is then set and roll 7, FIGS. 1 and 4, which travels at line speed and is the material treater control mechanism for line speed, is accordingly adjusted to reflect that setting.

The output from the oven model is the time ($\theta$) required to dry the treated web to the desired Va (Va spec.).

As previously stated our invention can be used with any type of resin application mechanism and is not restricted to a reverse roll coater. In the case of a squeeze roll, the output from the applicator model would be the set point for the gap between the two rolls. In the case of a dip and scrape operation, the output from the applicator model would be the dip roll position, i.e. the depth in the resin pan. Thus there would be no side-to-side control and blocks 24–26 of FIG. 2 would be removed.

By using feed forward control, based only on $BW_1$ variations to the applicator and the ovens of a material treater, optimum product quality at minimum material (resin) utilization and optimum throughput rates, are safely achieved.

We claim:
1. A method of controlling the application of a resinous solution to a fibrous host material and the drying of said fibrous host material which has been treated with said resinous solution which comprises:
   1. measuring a series of left side portion and right side portion weights of said host material before treatment and providing a signal (A) representative of said left side weights and a signal (B) representative of said right side weights,
   2. calculating the average weight of said host material before treatment from said signal (A) and said signal (B) and providing signal (C) representative of said average weight,
   3. calculating the desired weight of said host material after treatment and before drying from said signal (C) and providing a signal (D) representative of said desired weight,
   4. measuring the line speed of said host material and providing a signal (E) representative of said line speed.
   5. calculating the required roll speed of the device treating said host material from said signal (E) and said signal (D) and providing a signal (F) representative of said required roll speed,
   6. controlling the roll speed of the device treating said host material in accordance with said signal (F),
   7. measuring the average dryer temperature and providing a signal (G) representative of said average dryer temperature,
   8. calculating the line speed set point from said signal (C) and said signal (G) and providing a signal (H) representative of said line speed set point,
   9. controlling the line speed of said host material in accordance with said signal (H),
   10. calculating the difference between said signal (A) and said signal (B) and providing a signal (I) representative of said difference,
   11. calculating the roll gap change of said device required from said signal (I) to enable uniform application of said resinous solution and providing a signal (J) representative of said roll gap change,
   12. determining the left roll gap set point of said device from said signal (J) and providing a signal (K) representative of said left roll gap set point,
   13. controlling the left roll gap of said device in accordance with said signal (K),
   14. determining the right roll gap set point of said device from said signal (J) and providing a signal (L) representative of said right roll gap set point, and
   15. controlling the right roll gap of said device in accordance with said signal (L).
2. A method according to claim 1 wherein said line speed set point is calculated by a. calculating the desired weight of said treated host material after drying from said signal (C) and providing a signal (M) representative of said desired weight after drying, and
b. calculating said line speed set point from said signal (M) and said signal (G) to provide said signal (H).

3. A method according to claim 1 wherein said line speed set point is calculated by
I. providing a signal (N) representative of the temperature of said host material before treating,
II. calculating the weight of the treated, undried host material on a per square foot basis from said signal (D) and providing a signal (O) representative of said per square foot basis weight,
III. calculating the amount of resinous solution applied to said host material on a per square foot basis from said signal (D) and said signal (C) and providing a signal (P) representative of said amount of resinous solution applied,
IV. providing a signal (Q) representative of the moisture content of said host material before treatment,
V. calculating the dry weight of said host material from said signal (Q) and said signal (C) and providing a signal (R) representative of said dry weight,
VI. providing a signal (S) representative of the resin solids fraction of said resinous solution,
VII. calculating the total resin solids applied to said host material from said signal (S) and said signal (P) and providing a signal (T) representative of said total resin solids applied,
VIII. calculating the total solids of the treated host material from said signal (R) and said signal (T) and providing a signal (U) representative of said total solids,
IX. providing a signal (V) representative of the solvent component percentages and a signal (W) representative of the latent heat of vaporization of each solvent component,
X. calculating the final weight of each solvent component from said signal, and said signal (P) and providing a signal (X) representative of said final weights,
XI. providing a signal (Y) representative of the specification percent volatiles of the dried, treated host material,
XII. providing a signal (Z) representative of the heat capacity of the host material,
XIII. providing a signal (AA) representative of the desired, predetermined film coefficient of the treated, dried material,
XIV. providing a signal (BB) representative of the length of the dryer, and
XV. calculating the line speed set point from said signals (N), (O), (R), (U), (X), (W), (V), (Y), (Z), (AA), (BB) and (G) to provide said signal (H).

4. A method according to claim 3 wherein said solvent component percentages are provided by continuous on-line measurements.

5. A method according to claim 3 wherein said moisture content is continually measured.

6. In a fibrous host material treating process wherein said material is treated with a resinous solution in an applicator and dried in a dryer, apparatus for controlling the resin application to said material and the drying of the treated material comprising 1. gauge means adjacent to said material and before said applicator so as to measure a series of left side portion and right side portion weights of said host material before treatment and provide a signal (A) representative of said left side weights and a signal (B) representative of said right side weights,
2. means responsive to said signals (A) and (B) for calculating the average weight of said host material before treatment and providing a signal (C) representative of said average weight,
3. means responsive to said signal (C) for calculating the desired weight of said host material after treatment and before drying and providing a signal (D) representative of said desired weight,
4. means for measuring the line speed of said host material and providing a signal (E) representative of said line speed,
5. means responsive to said signal (D) and said signal (E) for calculating the required roll speed of said applicator treating said host material and providing a signal (F) representative of said required roll speed,
6. means responsive to said signal (F) for controlling the roll speed of the applicator treating said host material,
7. means for measuring the average temperature of the dryer and providing a signal (G) representative of said average dryer temperature,
8. means responsive to said signal (C) and said signal (G) for calculating the line speed set point and providing a signal (H) representative of said line speed set point,
9. means responsive to said signal (H) for controlling the line speed of said host material,
10. second means responsive to said signal (A) and said signal (B) for calculating the difference between said left side and said right side weights and providing a signal (I) representative of said difference,
11. means responsive to said signal (I) for calculating the roll gap change of said applicator required to enable uniform application of resinous solution and providing a signal (J) representative of said roll gap change,
12. means responsive to said signal (J) for determining the left roll gap set point of said applicator and providing a signal (K) representative of said left roll gap set point,
13. means responsive to said signal (K) for controlling the left gap of said applicator,
14. second means responsive to said signal (J) for determining the right roll gap set point of said applicator and providing a signal (L) representative of said right roll gap set point, and
15. means responsive to said signal (L) for controlling the right roll gap of said applicator.

7. Apparatus according to Claim 6 wherein said means for calculating the line speed set point comprises
a. means responsive to said signal (C) for calculating the desired weight of said treated host material after drying and providing a signal (M) representative of said desired weight after drying, and
b. means responsive to said signal (M) and said signal (G) for computing the line speed set print to provide said signal (H).

8. Apparatus according to Claim 6 wherein said means for calculating the line speed set point comprises I. means for providing a signal (N) representative of the temperature of said host material before treating,
II. means responsive to said signal (D) for calculating the weight of the treated, undried host material on a per square foot basis and providing a signal (O) representative of said per square foot basis weight,
III. means responsive to said signal (C) and signal (D) for calculating the amount of resinous solution applied to said host material on a per square foot basis and providing a signal (P) representative of said amount of resinous solution applied,
IV. means for providing a signal (Q) representative of the moisture content of said host material before treatment,
V. means responsive to said signal (Q) and said signal (C) for computing the dry weight of said host material and providing a signal (R) representative of said dry weight,
VI. means for providing a signal (S) representative of the resin solids fraction of said resinous solution,
VII. means responsive to said signal (P) and said signal (S) for computing the total resin solids applied to said host material and providing a signal (T) representative of said total resin solids applied,
VIII. means responsive to said signal (R) and said signal (T) for computing the total solids of the treated host material and providing a signal (U) representative of said total solids,
IX. means for providing a signal (V) representative of the solvent component percentages and a signal (W) representative of the heat of vaporization of each solvent component,
X. means responsive to said signal (V), and said signal (P) for calculating the final weight of each solvent component and providing a signal (X) representative of said final weights,
XI. means for providing a signal (Y) representative of the specification percent volatiles of the dried, treated host material,
XII. means for providing a signal (Z) representative of the heat capacity of the host material,
XIII. means for providing a signal (AA) representative of the desired, predetermined film coefficient of the treated, dried material,
XIV. means for providing a signal (BB) representative of the length of the dryer, and
XV. means responsive to said signals (N), (O), (R), (U), (X), (W), (Y), (Z), (AA), (BB) and (G) for computing the line speed set point to provide said signal (H).

9. Apparatus according to claim 8 wherein said means for providing solvent component percentages includes continuous on-line measurement means.

10. Apparatus according to claim 8 comprising second gauge means mounted before said applicator and adjacent to said host material for continuously providing a measurement of the moisture content thereof.

* * * * *